(12) United States Patent
Kawashima et al.

(10) Patent No.: US 12,722,124 B2
(45) Date of Patent: Sep. 1, 2026

(54) STATE DIAGNOSIS METHOD FOR SEPARATION MEMBRANE ELEMENT

(71) Applicant: Toray Industries, Inc., Chuo-ku (JP)

(72) Inventors: Yoshiyuki Kawashima, Otsu (JP); Kazunori Tomioka, Otsu (JP); Koji Nakatsuji, Iyo-gun (JP); Seiichi Amamiya, Otsu (JP)

(73) Assignee: Toray Industries, Inc., Tokyo (JP)

( * ) Notice: Subject to any disclaimer, the term of this patent is extended or adjusted under 35 U.S.C. 154(b) by 285 days.

(21) Appl. No.: 18/714,194

(22) PCT Filed: Nov. 30, 2022

(86) PCT No.: PCT/JP2022/044296

§ 371 (c)(1),
(2) Date: May 29, 2024

(87) PCT Pub. No.: WO2023/100958

PCT Pub. Date: Jun. 8, 2023

(65) Prior Publication Data

US 2025/0018343 A1 Jan. 16, 2025

(30) Foreign Application Priority Data

Nov. 30, 2021 (JP) ................................ 2021-193800

(51) Int. Cl.
*B01D 65/10* (2006.01)
*G01N 15/08* (2006.01)
(Continued)

(52) U.S. Cl.
CPC ......... *B01D 65/10* (2013.01); *G01N 15/0806* (2013.01); *B01D 61/025* (2013.01); *B01D 63/10* (2013.01); *G01N 2015/084* (2013.01)

(58) Field of Classification Search
CPC ............. G01N 2001/381; G01N 15/08; G01N 15/082; G01N 15/0826; B01D 65/10
See application file for complete search history.

(56) References Cited

U.S. PATENT DOCUMENTS

| | | | |
|---|---|---|---|
| 2015/0053596 | A1 | 2/2015 | Kageyama et al. |
| 2021/0370235 | A1 | 12/2021 | Hamada et al. |
| 2023/0174390 | A1 | 6/2023 | Tomioka et al. |

FOREIGN PATENT DOCUMENTS

| | | | |
|---|---|---|---|
| JP | 2001062255 | A | 3/2001 |
| JP | 5656718 | B2 | 12/2014 |

(Continued)

OTHER PUBLICATIONS

Hamada et al. (WO 2020/071507 A1), Method for Preparing Water Quality Profile, Method for Inspecting Separation Membrane Module, and Water Treatment Apparatus, Aug. 2021, Espacenet Machine Translation (Year: 2021).*

(Continued)

*Primary Examiner* — Erika J. Villaluna
(74) *Attorney, Agent, or Firm* — Buchanan Ingersoll & Rooney PC

(57) ABSTRACT

The present invention relates to a state diagnosis method for a separation membrane element, including: calculating an initial value of a membrane separation performance based on at least any of a pressure, a flow rate, and a solute concentration of water-to-be-treated and at least any of a pressure, a flow rate, and a solute concentration of permeate; measuring a permeate quality at at least two locations in a permeate channel; calculating the membrane separation performance for each of the measurement locations using the initial value of the membrane separation performance, and determining an evaluation membrane separation performance; comparing the determined evaluation membrane separation performance with a reference membrane separa- (Continued)

tion performance as a reference; and determining a state of the separation membrane element based on a predetermined state diagnosis reference of the separation membrane element.

19 Claims, 9 Drawing Sheets

(51) Int. Cl.
*B01D 61/02* (2006.01)
*B01D 63/10* (2006.01)

(56) References Cited

FOREIGN PATENT DOCUMENTS

| | | | |
|---|---|---|---|
| JP | 2015042385 | A | 3/2015 |
| JP | 2020163252 | A | 10/2020 |
| JP | 6825724 | B2 | 1/2021 |
| WO | 2013093537 | A1 | 6/2013 |
| WO | 2020071507 | A1 | 4/2020 |
| WO | 2021162093 | A1 | 8/2021 |

OTHER PUBLICATIONS

International Search Report (PCT/ISA/210) with translation and Written Opinion (PCT/ISA/237) mailed Jan. 31, 2023, by the Japanese Patent Office as the International Searching Authority for International Application No. PCT/JP2022/044296 (9 pages).

* cited by examiner

STATE DIAGNOSIS METHOD FOR SEPARATION MEMBRANE ELEMENT

CROSS REFERENCE TO RELATED APPLICATIONS

This application is the U.S. National Phase of PCT/JP2022/044296, filed Nov. 30, 2022 which claims priority to Japanese Patent Application No. 2021-193800, filed Nov. 30, 2021, the disclosures of these applications being incorporated herein by reference in their entireties for all purposes.

FIELD OF THE INVENTION

The present invention relates to a state diagnosis method for a separation membrane element.

BACKGROUND OF THE INVENTION

In recent years, liquid separation techniques using various kinds of separation membranes such as a reverse osmosis membrane, a nanofiltration membrane, an ultrafiltration membrane, and a microfiltration membrane have been developed, and are used in water treatment processes for seawater, brine, wastewater, and the like.

In such water treatment processes, deterioration of a separation membrane causes one or both of a reduction in solvent permeability and an increase in solute permeability, thereby deteriorating performance of a separation membrane element.

The deterioration of the separation membrane can be classified into two kinds including chemical deterioration and physical deterioration.

Examples of the chemical deterioration include membrane contamination (fouling), such as precipitation of insoluble salts in water-to-be-treated on a separation membrane surface and formation of a biofilm on the separation membrane surface due to microorganisms in the water-to-be-treated, and decomposition of a separation membrane due to a chemical reaction with a chemical such as hypochlorous acid, sodium hydroxide, or hydrochloric acid used in chemical cleaning executed to remove the fouling.

Examples of the physical deterioration include densification in which a separation membrane is compressed by a pressure applied to the separation membrane.

When the separation membrane is damaged due to contact between solid impurities contained in the water-to-be-treated and the separation membrane, pressure change caused by start and stop of the water treatment process, or the like, the water-to-be-treated leaks to a permeate side, and a mixing rate of water-to-be-treated increases.

When an abnormality such as deterioration or damage occurs in the separation membrane, concentration of a solute to be separated in the permeate increases and water quality of the permeate deteriorates, so that it is necessary to identify a separation membrane element in which the abnormality has occurred and replace it with a normal separation membrane element.

Accordingly, Patent Literature 1 proposes a device in which, for a plurality of separation membrane elements accommodated in a pressure vessel, an integrated sensor of flow rate and electric conductivity is inserted into a water collecting pipe of each separation membrane element in the pressure vessel to detect a separation membrane element with reduced performance.

In addition, Patent Literature 2 proposes an inspection method in which a plurality of permeate outlets are provided for a plurality of separation membrane elements accommodated in a pressure vessel, and a water quality profile of permeate flowing out from the plurality of permeate outlets is created to detect a separation membrane element in which an abnormality has occurred and determine a position and a degree of the abnormality.

PATENT LITERATURE

Patent Literature 1: JP5656718B
Patent Literature 2: JP6825724B

SUMMARY OF THE INVENTION

However, in the inspection method described in Patent Literature 1 and Patent Literature 2, the separation membrane element whose performance is reduced due to the abnormality can be detected, but in Patent Literature 1, the position where the abnormality has occurred inside the separation membrane element cannot be identified.

In addition, in the inspection method described in Patent Literature 1 and Patent Literature 2, since it is impossible to identify whether a cause of the abnormality is damage or deterioration of the separation membrane, it is difficult to take an appropriate measure against the abnormality.

Accordingly, an object of the present invention is to provide a state diagnosis method for a separation membrane element, a program in which the diagnosis method is incorporated, and a computer-readable recording medium on which the program is recorded, which can extremely easily and quickly identify a cause, a location, and a degree of an abnormality occurring in the separation membrane element.

In order to solve the above problem, the present invention has the following features.

(1) A state diagnosis method for a separation membrane element for obtaining a permeate from a water-to-be-treated, the method including:

calculating an initial value of a membrane separation performance based on at least any of a pressure, a flow rate, and a solute concentration of the water-to-be-treated and at least any of a pressure, a flow rate, and a solute concentration of the permeate;

measuring a permeate quality at at least two locations in a permeate channel of the separation membrane element;

calculating the membrane separation performance for each of the measurement locations using the initial value of the membrane separation performance, and determining an evaluation membrane separation performance such that a difference between a calculated permeate quality calculated based on the membrane separation performance and a measured permeate quality falls within a predetermined range;

comparing the determined evaluation membrane separation performance with a reference membrane separation performance as a reference; and determining a state of the separation membrane element based on a predetermined state diagnosis reference of the separation membrane element.

(2) The state diagnosis method for a separation membrane element according to (1), in which the membrane separation performance is at least any of a removal rate, a permeability, a solvent permeability coefficient, a solute permeability coefficient, and a mixing rate of water-to-be-treated.

(3) The state diagnosis method for a separation membrane element according to (1) or (2), in which the membrane separation performance is the solvent permeability coefficient, the solute permeability coefficient, and the mixing rate of water-to-be-treated, which are calculated by a membrane permeation calculation, and the evaluation membrane separation performance and the reference membrane separation performance are the solvent permeability coefficient and the solute permeability coefficient common to the measurement locations, and the mixing rate of water-to-be-treated which is individual for each of the measurement locations.

(4) The state diagnosis method for a separation membrane element according to any of (1) to (3), in which the membrane permeation calculation is based on a concentration polarization formula derived from a concentration polarization model representing a mass balance of solute permeation.

(5) The state diagnosis method for a separation membrane element according to any of (1) to (4), in which the measurement of the permeate quality is executed at each of the measurement locations dividing the permeate channel in an axial direction, and a pressure of the water-to-be-treated at second and subsequent measurement location are calculated from a supply pressure and a flow rate of the water-to-be-treated supplied to a preceding measurement location by pressure loss calculation based on fluid dynamics.

(6) The state diagnosis method for a separation membrane element according to any of (1) to (5), in which the measured permeate quality and the calculated permeate quality is at least any of an electric conductivity, TOC, a refractive index, a turbidity, an absorbance, an emission intensity, a chromaticity, IR, a mass spectrometry, an ion chromatography, ICP, pH, and a radiation ray.

(7) The state diagnosis method for a separation membrane element according to any of (1) to (6), in which a method of measuring the permeate quality from the at least two locations is a method of measuring water quality by passing through a thin tube to the separation membrane element and sampling the permeate at different locations of the separation membrane element.

(8) The state diagnosis method for a separation membrane element according to any of (1) to (7), in which the separation membrane element is a spiral type reverse osmosis membrane element, and a tube is inserted into a central pipe for permeate collection to sample the permeate at each distance of movement, and the measurement location is defined for each water sampling.

(9) The state diagnosis method for a separation membrane element according to any of (1) to (8), in which the separation membrane element has a structure capable of taking the permeate from at least two locations, and changes a flow rate ratio of the permeate.

(10) The state diagnosis method for a separation membrane element according to any of (1) to (9), in which the state of the separation membrane element determined based on the state diagnosis reference is degradation and damage, and is at least any of presence or absence of degradation and damage, a position of damage, and a degree of degradation and damage.

(11) The state diagnosis method for a separation membrane element according to any of (3) to (10), in which in the state diagnosis reference, it is determined as deterioration when at least any of a case where an evaluation solvent permeability coefficient is reduced from a reference solvent permeability coefficient and a case where an evaluation solute permeability coefficient is increased from a reference solute permeability coefficient occurs, and the degree of the deterioration is determined based on at least any of a degree of reduction of the evaluation solvent permeability coefficient from the reference solvent permeability coefficient and a degree of increase of the evaluation solute permeability coefficient from the reference solute permeability coefficient.

(12) The state diagnosis method for a separation membrane element according to any of (3) to (10), in which in the state diagnosis reference, it is determined as occurrence of damage in a case where an evaluation mixing rate of water-to-be-treated at the measurement location is increased from a reference mixing rate of water-to-be-treated and a damage position is determined at the measurement location, or the degree of damage is determined based on a degree of increase of the evaluation mixing rate of water-to-be-treated at the measurement location from the reference mixing rate of water-to-be-treated.

(13) A state diagnosis program for a separation membrane element, the program causing, in order to execute state diagnosis of a separation membrane element for obtaining a permeate from a water-to-be-treated, a computer to function as:

a data input unit configured to input data of the separation membrane element of at least any of a pressure, a flow rate, and a solute concentration of the water-to-be-treated, at least any of a pressure, a flow rate, and a solute concentration of the permeate, and a permeate quality measured at at least two locations of a permeate channel;

a membrane separation performance initial value calculation unit configured to calculate an initial value of a membrane separation performance;

an evaluation membrane separation performance determination unit configured to calculate the membrane separation performance for each of the measurement locations using the initial value of the membrane separation performance, and determine an evaluation membrane separation performance such that a difference between a calculated permeate quality calculated based on the membrane separation performance and a measured permeate quality falls within a predetermined range;

a membrane separation performance comparison unit configured to compare the determined membrane separation performance with a reference membrane separation performance; and a separation membrane element state diagnosis unit configured to diagnose a state of the separation membrane element based on a predetermined state diagnosis reference of the separation membrane element from a result of the comparison of the membrane separation performance.

(14) The state diagnosis program for a separation membrane element according to (13), the program causing, in order to execute the state diagnosis of the separation membrane element for obtaining the permeate from the water-to-be-treated, a computer to function as:

a membrane separation performance calculation selecting unit configured to select to calculate, for the calculation of membrane separation performance, at least any of a removal rate, a permeability, a solvent permeability coefficient, a solute permeability coefficient, and a mixing rate of the water-to-be-treated.

(15) The state diagnosis program for a separation membrane element according to (13) or (14), the program causing, in order to execute the state diagnosis of the separation membrane element for obtaining the permeate from the water-to-be-treated, a computer to function as:

a performance analysis limiting unit configured to calculate, by a membrane separation performance calculation unit, the solvent permeability coefficient, the solute permeability coefficient, and the mixing rate of water-to-be-treated, which are calculated by membrane permeation calculation, as the membrane separation performance, and calculate the evaluation membrane separation performance and the reference membrane separation performance as the solvent permeability coefficient and the solute permeability coefficient common to the measurement locations, and the mixing rate of water-to-be-treated which is individual for each of the measurement locations.

(16) The state diagnosis program for a separation membrane element according to any of (13) to (15), the program causing, in order to execute the state diagnosis of the separation membrane element for obtaining the permeate from the water-to-be-treated, a computer to function as:

a concentration polarization formula calculation unit configured to execute the membrane permeation calculation based on a concentration polarization formula derived from a concentration polarization model representing a mass balance of solute permeation.

(17) The state diagnosis program for a separation membrane element according to any of (13) to (16), the program causing, in order to execute the state diagnosis of the separation membrane element for obtaining the permeate from the water-to-be-treated, a computer to function as:

a pressure loss calculation unit configured to calculate a pressure of the water-to-be-treated at second and subsequent measurement location among the measurement locations from a supply pressure and a flow rate of the water-to-be-treated supplied to a preceding measurement location by pressure loss calculation based on fluid dynamics.

(18) The state diagnosis program for a separation membrane element according to any of (13) to (17), the program causing, in order to execute the state diagnosis of the separation membrane element for obtaining the permeate from the water-to-be-treated, a computer to function as:

a permeate quality determination unit configured to determine, for the measured permeate quality and the calculated permeate quality, permeate quality based on at least any of an electric conductivity, TOC, a refractive index, a turbidity, an absorbance, an emission intensity, a chromaticity, IR, a mass spectrometry, an ion chromatography, ICP, pH, and a radiation ray.

(19) The state diagnosis program for a separation membrane element according to any of (13) to (18), the program causing, in order to execute the state diagnosis of the separation membrane element for obtaining the permeate from the water-to-be-treated, a computer to function as:

a separation membrane element state determination unit configured to determine that a state of the separation membrane element determined based on the state diagnosis reference is degradation and damage, and is at least any of presence or absence of degradation and damage, a position of damage, and a degree of degradation and damage.

(20) The state diagnosis program for a separation membrane element according to any of (15) to (19), the program causing, in order to execute the state diagnosis of the separation membrane element for obtaining the permeate from the water-to-be-treated, a computer to function as:

a separation membrane element deterioration determination unit configured to, as the state diagnosis reference, determine as deterioration when at least any of a case where an evaluation solvent permeability coefficient is reduced from a reference solvent permeability coefficient and a case where an evaluation solute permeability coefficient is increased from a reference solute permeability coefficient occurs, and determine the degree of deterioration based on at least any of a degree of reduction of the evaluation solvent permeability coefficient from the reference solvent permeability coefficient and a degree of increase of the evaluation solute permeability coefficient from the reference solute permeability coefficient.

(21) The state diagnosis program for a separation membrane element according to any of (15) to (19), the program causing, in order to execute the state diagnosis of the separation membrane element for obtaining the permeate from the water-to-be-treated, a computer to function as:

a separation membrane element damage determination unit configured to, as the state diagnosis reference, determine that damage occurs in a case where an evaluation mixing rate of water-to-be-treated at the measurement location is increased from a reference mixing rate of water-to-be-treated and determine the damage position at the measurement location, or determine the degree of damage based on a degree of increase of the evaluation mixing rate of water-to-be-treated at the measurement location from the reference mixing rate of water-to-be-treated.

(22) A computer-readable recording medium on which the state diagnosis program for a separation membrane element according to any of (13) to (21) is recorded.

According to the present invention, since the cause and degree of the occurrence of the abnormality in the separation membrane element can be extremely easily detected, and an accurate measure can be taken against the abnormality, a water treatment device can be stably operated.

DETAILED DESCRIPTION OF EMBODIMENTS OF THE INVENTION

Figure 1:
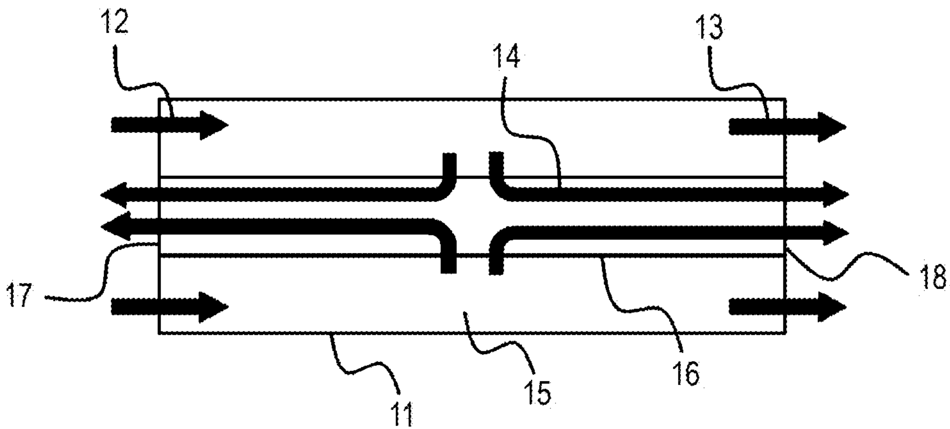
FIG. 1 is a schematic diagram of a separation membrane element according to the present invention.

Hereinafter, embodiments of the present invention will be described with reference to the drawings. The present invention is not limited to the embodiments.

The present invention is a state diagnosis method for a separation membrane element for separating water-to-be-treated into concentrate and permeate, the method including: regarding a state diagnosis separation membrane element whose state is to be diagnosed among one or a plurality of separation membrane elements connected in series and in operation, a step 1 of calculating an initial value of membrane separation performance based on at least any of a pressure, a flow rate, and solute concentration of the water-to-be-treated and a pressure, a flow rate, and solute concentration of the permeate and a step 2 of measuring measured water quality of the permeate in a permeate channel (water collecting pipe) where the permeate is collected at any two or more points;

- a step 3 of executing calculation of membrane separation performance for each measurement location using the initial value of the membrane separation performance, and determining evaluation membrane separation performance such that a difference between calculated permeate quality calculated based on the membrane separation performance and measured permeate quality falls within a predetermined range; and
- a step 4 of comparing the determined evaluation membrane separation performance with reference membrane separation performance obtained in advance as a reference to be compared, and determining a state of the state diagnosis state diagnosis separation membrane element based on a predetermined state diagnosis reference of a state diagnosis target separation membrane element.

The membrane separation performance generally includes a removal rate (=1−permeate concentration/concentration of water-to-be-treated), permeability (=permeate concentration/concentration of water-to-be-treated), a solvent permeability coefficient, a solute permeability coefficient, and a mixing rate of water-to-be-treated. In particular, when the solvent permeability coefficient, the solute permeability coefficient, and the mixing rate of water-to-be-treated are used, the membrane separation performance can be analyzed more accurately, which is preferable. Therefore, the solvent permeability coefficient, the solute permeability coefficient, and the mixing rate of water-to-be-treated will be described as an example in the present application.

Here, examples of the water-to-be-treated supplied to the separation membrane element include seawater, river water, underground water, and treated waste water. In addition, in a case where a separation membrane element extracted from an actual machine is evaluated, it is preferable to use a solution in which NaCl, $MgSO_4$, or the like is dissolved. Further, a concentration of water-to-be-treated during the evaluation is preferably set to a condition easy to measure, but is not particularly limited. Generally, a concentration of NaCl is preferably 50 mg/L to 70,000 mg/L, more preferably 500 mg/L to 35,000 mg/L, and a concentration of $MgSO_4$ is preferably 50 mg/L to 10,000 mg/L, more preferably 500 mg/L to 4,000 mg/L.

In a case where a separation membrane element served for use (during operation) is to be diagnosed, it is necessary to stop a supply of the water-to-be-treated and switch to NaCl, $MgSO_4$, or the like, or to remove the separation membrane element from a piece of equipment and load the separation membrane element in a device for diagnosis. In a case where the diagnosis is to be executed during an actual operation of a plant, the diagnosis can also be executed in a state during operation, that is, in a state where the raw water is directly used as the water-to-be-treated. However, it should be noted that a solute other than the solute to be subjected to comparative evaluation is often contained therein, which affects analysis accuracy.

A separation membrane included in the separation membrane element is a membrane that filters the water-to-be-treated by utilizing a pressure difference between both surfaces of the membrane and captures substances having a particle diameter exceeding a certain value contained in the water-to-be-treated, and can be used as various kinds of separation membranes such as a reverse osmosis membrane, a nanofiltration membrane, an ultrafiltration membrane, a microfiltration membrane, an ion exchange membrane, a gas separation membrane, and a filter cloth, and in particular, an application to a microfiltration membrane, an ultrafiltration membrane, a nanofiltration membrane, or a reverse osmosis membrane for water treatment that producing drinking water or various kinds of water by treating seawater, river water, or the like can contribute to a reduction in water treatment cost, which is very preferable. In addition, an element shape is also not particularly limited and examples of the shape include a spiral type, a hollow fiber type, a flat membrane parallel plate (plate and frame) type, and the like.

As a material of the reverse osmosis membrane or the nanofiltration membrane used in the present invention, for example, a polymer material such as a cellulose acetate-based polymer, polyamide, polyester, polyimide, and a vinyl polymer can be used. In addition, a membrane structure thereof may be either an asymmetric membrane provided with a dense layer on at least one surface of the membrane and having micropores having a gradually increasing pore diameter from the dense layer toward an inside of the membrane or the other surface, or a composite membrane having a very thin functional layer formed of another material on the dense layer of the asymmetric membrane.

Examples of the ultrafiltration membrane and the microfiltration membrane include porous membranes such as polyacrylonitrile, polyimide, polyethersulfone, polyphenylene sulfide sulfone, polytetrafluoroethylene, polypropylene, and polyethylene.

Further, the present invention can be applied as a composite separation membrane having high permeability by combining rubber-like high molecules such as crosslinked silicone, polybutadiene, polyacrylonitrile butadiene, ethylene propylene rubber, and neoprene rubber as a functional layer with the porous membrane.

A structure of the separation membrane element varies depending on an application of the membrane, and in a case of a reverse osmosis membrane and a nanofiltration membrane, a spiral type structure is common. FIG. 1 illustrates a schematic diagram of an element used as a most typical spiral type reverse osmosis membrane element.

A separation membrane element 11 includes a separation membrane 15 that separates water-to-be-treated 12 into concentrate 13 and permeate 14, and a water collecting pipe 16 having a plurality of holes that collects the permeate 14, an end portion 17 and an end portion 18 of the water collecting pipe 16 are open, and the permeate 14 can be taken out.

In addition, by sealing either one of the end portion 17 and the end portion 18 with a sealing means, the permeate 14 can be taken out from a non-sealed side of the end portion 17 and the end portion 18. For example, in FIG. 2, the end portion 17 on an inlet side of water-to-be-treated is sealed by a sealing means 21, and the permeate 14 is taken out from the end portion 18.

A term "water quality" as used herein refers to at least any of electric conductivity, TOC, refractive index, turbidity, absorbance, emission intensity, chromaticity, IR, mass spectrometry, ion chromatography, ICP, pH, and radiation rays, and in particular, the electric conductivity, which is easy to measure, is preferred.

In order to obtain solute concentration based on the electric conductivity of each permeate, a relation between the solute concentration and the electric conductivity may be obtained in advance by a known method in the related art. When a relational expression between a concentration of each ionic substance and the electric conductivity is prepared in advance, the electric conductivity can be easily converted into the concentration, which is preferable.

Here, a measurement location of measured water quality is preferably defined by dividing the water collecting pipe in an axial direction. Specifically, when the measurement location of the measured water quality matches a location of a hole of the water collecting pipe and the number of measurement locations matches the number of holes of the water collecting pipe, distribution of the measured water quality of the permeate 14 inside the water collecting pipe 16 can be finely obtained, which is preferable.

In step 1, membrane permeation calculation of a solvent and a solute of the state diagnosis target separation membrane element is executed based on operating conditions. The solvent permeability coefficient and the solute permeability coefficient obtained by the membrane permeation calculation are initial values, and it is preferable to define an initial value of the mixing rate of water-to-be-treated as zero.

Here, the operating conditions include a pressure of water-to-be-treated $P_F(0)$, a flow rate of water-to-be-treated $Q_F(0)$, and solute concentration of water-to-be-treated $C_F(0)$ at the end portion 17 of the state diagnosis target separation membrane element, a permeate pressure $P_P(0)$, a permeate flow rate $Q_P(0)$, and permeate concentration $C_P(0)$ of the permeate at the end portion 18 of the element. First, solute concentration $C_M(0)$ on a membrane surface is calculated based on the following concentration polarization formula.

$$C_M(0) = (C_F(0) - C_P(0)) \times \exp\left(\frac{Q_P(0)/A(0)}{k(0)}\right) + C_P(0) \quad \text{[Formula 1]}$$

$$k = \frac{Sh(0)D(0)}{d}$$

$$Sh(0) = aRe^b Sc^c$$

$A(0)$ [m$^2$]: membrane area of state diagnosis target separation membrane element a [—]: constant b [—]: constant c [—]: constant $C_F(0)$ [kg/m$^3$]: solute concentration of water-to-be-treated of state diagnosis target separation membrane element $C_M(0)$ [kg/m$^3$]: solute concentration on membrane surface of state diagnosis target separation membrane element $C_P(0)$ [kg/m$^3$]: solute concentration of permeate of state diagnosis target separation membrane element d [m]: channel thickness of layer in which mass transfer of state diagnosis target separation membrane element is performed $D(0)$ [m$^2$/s]: solute diffusion coefficient of water-to-be-treated of state diagnosis target separation membrane element $k(0)$ [m/s]: mass transfer coefficient of state diagnosis target separation membrane element $Q_P(0)$ [m$^3$/s]: flow rate of permeate of state diagnosis target separation membrane element $Re(0)$ [—]: Reynolds number of state diagnosis target separation membrane element $Sc(0)$ [—]: Schmidt number of state diagnosis target separation membrane element $Sh(0)$ [—]: Sherwood number of state diagnosis target separation membrane element Formula 1 is calculated based on a basic concentration polarization formula shown in Formula 2. Concentration polarization is a phenomenon in which a solute is deposited on the membrane surface in membrane filtration, and solute concentration near the membrane surface becomes higher than that of the water-to-be-treated. By incorporating this phenomenon into the membrane permeation calculation, calculation accuracy can be improved.

$$\frac{C_M - C_P}{C_F - C_P} = \exp\frac{J_v}{k} \quad \text{[Formula 2]}$$

$C_F$ [kg/m$^3$]: solute concentration of water-to-be-treated
$C_M$ [kg/m$^3$]: solute concentration on membrane surface
$C_P$[kg/m$^3$]: solute concentration of permeate
$J_V$[m$^3$/m$^2$·s]: solvent permeation flux
k [m/s]: mass transfer coefficient Next, using $C_M(0)$, an initial value $L_P(0)$ of the solvent permeability coefficient and an initial value $P_S(0)$ of the solute permeability coefficient are obtained by the following formula. An initial value α(0) of the mixing rate of water-to-be-treated may be a default value, but is preferably defined as zero because analysis is difficult at this stage.

[Formula 3]

$$L_P(0) = \frac{Q_P(0)}{A(0)\,[P_F(0) - P_P(0) - \pi_M(0) + \pi_P(0)]\,[1 + \alpha(0)]}$$

$$P_S(0) = \frac{C_P(0)\,Q_P(0) - C_F(0)\,Q_P(0)\dfrac{\alpha(0)}{1 + a(0)}}{A(0)\,[C_M(0) - C_P(0)]}$$

$$\pi_M(0) = F(C_M(0)),\ \pi_P(0) = F(C_P(0))$$

Figure 2:
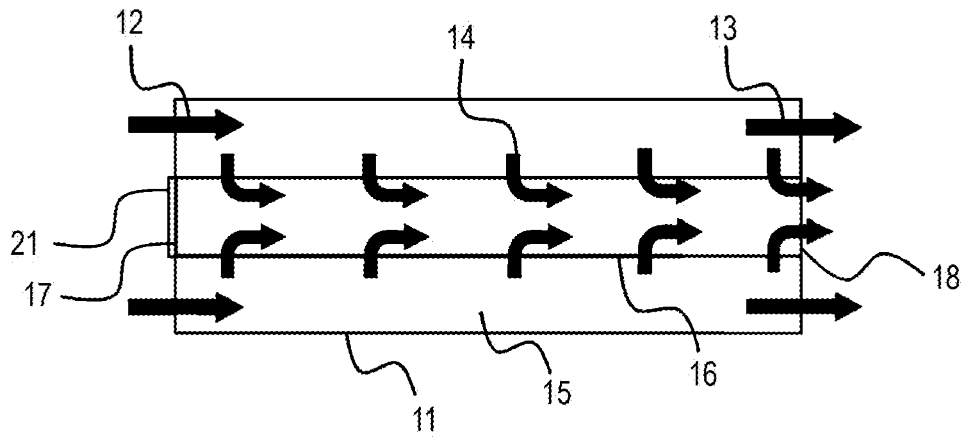
FIG. 2 is a schematic diagram of when an end portion of the separation membrane element illustrated in FIG. 1 is sealed by a sealing means.

A(0) [m$^2$]: membrane area of state diagnosis target separation membrane element
$C_F(0)$ [kg/m$^3$]: solute concentration of water-to-be-treated of state diagnosis target separation membrane element
$C_M(0)$ [kg/m$^3$]: solute concentration on membrane surface of state diagnosis target separation membrane element
$C_P(0)$ [kg/m$^3$]: solute concentration of permeate of state diagnosis target separation membrane element
F [Pa]: function for calculating osmotic pressure
G [Pa]: function for calculating pressure loss of water-to-be-treated
$L_P(0)$ [m/s/Pa]: initial value of solvent permeability coefficient of separation membrane
$P_F(0)$ [Pa]: pressure of water-to-be-treated of state diagnosis target separation membrane element
$P_P(0)$ [Pa]: pressure of permeate of state diagnosis target separation membrane element
$P_S(0)$ [m/s]: initial value of solute permeability coefficient of separation membrane
$Q_F(0)$ [m$^3$/S]: flow rate of water-to-be-treated of state diagnosis target separation membrane element
$Q_P(0)$ [m$^3$/s]: flow rate of permeate of state diagnosis target separation membrane element α(0) [—]: initial value of mixing rate of water-to-be-treated of state diagnosis target separation membrane element
$\pi_M(0)$[Pa]: membrane surface osmotic pressure of water-to-be-treated of state diagnosis target separation membrane element
$\pi_P(0)$ [Pa]: osmotic pressure of permeate of state diagnosis target separation membrane element In FIG. 2, when a hose or tube having an outer diameter smaller than an inner diameter of the water collecting pipe 16 is inserted into the water collecting pipe 16 of the separation membrane element 11 from the end portion 18 in the axial direction of the water collecting pipe, the permeate at a location of the tip of the inserted hose or tube can be taken out.

In step 2, the permeate 14 inside the water collecting pipe 16 is measured at two or more points in this manner.

In step 3, these initial values of the membrane separation performance are used to execute calculation of the membrane separation performance for each measurement location, and determine the evaluation membrane separation performance such that the difference between the calculated permeate quality calculated based on the membrane separation performance and the measured permeate quality falls within the predetermined range.

Specifically, regarding a state diagnosis target separation membrane element, in a case where a measurement location of the measured water quality to be subject to state diagnosis of a plurality of separation membrane elements connected in series is located behind a leading measurement location when viewed from a supply side of the water-to-be-treated, an end portion pressure of water-to-be-treated $P_F(1)$ of the state diagnosis target separation membrane element is calculated based on a water-to-be-treated supply pressure of the water-to-be-treated supplied to the leading measurement location and pressure loss calculation based on fluid dynamics, and an end portion solute concentration of water-to-be-treated $C_F(1)$ of the state diagnosis target separation membrane element is calculated based on a water-to-be-treated supply solute concentration of the water-to-be-treated supplied to a leading separation membrane element and a permeate end portion solute concentration calculated based on the measured water quality of the permeate inside the water collecting pipe at the end portion on the supply side of the water-to-be-treated of the water collecting pipe.

Even in a case where a plurality of separation membrane elements are arranged in series and the state diagnosis is executed for each separation membrane element, the end portion pressure of water-to-be-treated $P_F(1)$ and the end portion solute concentration of water-to-be-treated $C_F(1)$ can be calculated in the same manner by the above method.

Figure 3:
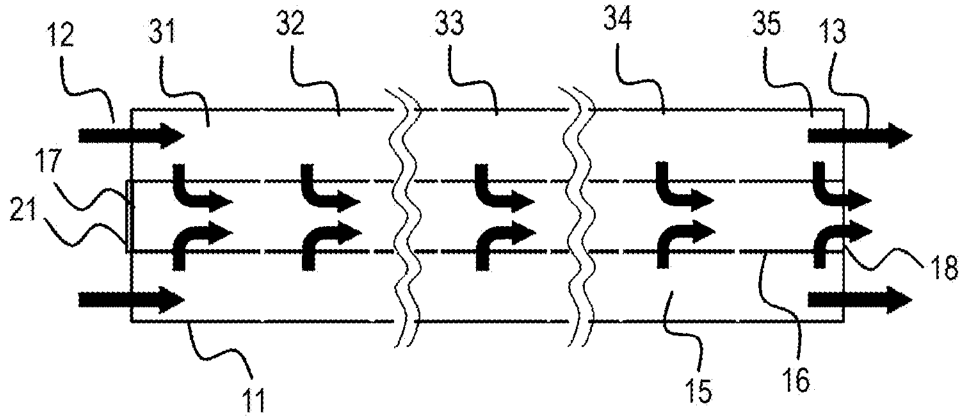
FIG. 3 is a schematic diagram illustrating n ($n \geq 2$) measurement locations of the separation membrane element illustrated in FIG. 2.

FIG. 3 is a schematic diagram in a case where the state diagnosis is executed at n (n≥2) locations for the state diagnosis target separation membrane element.

A solute concentration of i-th permeate 14 can be obtained by executing the membrane permeation calculation. A specific method of the membrane permeation calculation for the separation membrane element at n locations is shown below.

(1) For a first measurement location, calculations in (2) to (6) are executed to calculate a flow rate $Q_P(i)$ and solute concentration $C_P(i)$ of the i-th permeate.

(2) For an i-th (1≤i≤n) measurement location, initial values of $Q_P(i)$ and $C_P(i)$ are set to values smaller than a flow rate $Q_F(i)$ and solute concentration $C_F(i)$ of the water-to-be-treated.

This is because when $Q_P(i) \geq Q_F(i)$, a flow rate of the concentrate becomes zero or negative, and a mass balance of the solvent is broken. In addition, this is because since a removal rate of the solute of the separation membrane element is greater than zero, $C_P(i) \geq C_F(i)$ is not satisfied.

(3) Using the initial values of $Q_P(i)$ and $C_F(i)$, solute concentration $C_M(i)$ on the membrane surface is calculated based on the following concentration polarization formula.

[Formula 4]

$$C_M(i) = \begin{cases} (C_F(1) - C_P(1)) \times \exp\left(\dfrac{Q_P(1)/A(1)}{k(1)}\right) + C_P(1) & (i = 1) \\ (C_F(1) - C_P(1)) \times \exp\left(\dfrac{(Q_P(i) - Q_P(1))/A(1)}{k(1)}\right) + C_P(1) & (2 \leq i \leq n) \end{cases}$$

$$k = \frac{Sh(i)D(i)}{d}$$

$$Sh(i) = aRe^b Sc^c$$

A(i) [m$^2$]: membrane area at i-th measurement location
a [—]: constant b [—]: constant c [—]: constant $C_F(i)$ [kg/m$^3$]: solute concentration of water-to-be-treated at i-th measurement location $C_M(i)$ [kg/m$^3$]: solute concentration on membrane surface at i-th measurement location $C_P(i)$ [kg/m$^3$]: solute concentration of permeate at i-th measurement location d [m]: channel thickness of layer in which mass transfer is performed at i-th measurement location D(i) [m$^2$/s]: solute diffusion coefficient of water-to-be-treated at i-th measurement location k(i) [m/s]: mass transfer coefficient at i-th measurement location $Q_P(i)$ [m$^3$/s]: flow rate of permeate at i-th measurement location Re(i) [—]: Reynolds number of water-to-be-treated at i-th measurement location Sc(i) [—]: Schmidt number of water-to-be-treated at i-th measurement location Sh(i) [—]: Sherwood number of water-to-be-treated at i-th measurement location (4) Using $C_M(i)$, calculated values of $Q_P(i)$ and $C_P(I)$ are obtained by the following formula.

Here, in calculation of an osmotic pressure, the osmotic pressure is generally calculated by a theoretical formula such as a van't Hoff formula or a Pitzer formula.

In an initial calculation stage here, it is preferable to use the initial value $L_P(0)$ of the solvent permeability coefficient, the initial value $P_S(0)$ of the solute permeability coefficient, and the initial value $\alpha(0)$ of the mixing rate of water-to-be-treated calculated in step 1 as a solvent permeability coefficient $L_P$, a solute permeability coefficient $P_S$ and a mixing rate of water-to-be-treated $\alpha$.

[Formula 5]

$$Q_P(i) = \begin{cases} A(1)L_P[P_F(1) - P_P(1) - \pi_M(1) + \pi_P(1)][1 + \alpha(1)] & (i = 1) \\ A(i)L_P[P_F(i) - P_P(i) - \pi_M(i) + \pi_P(i)][1 + \alpha(i)] + Q_P(i-1) & (2 \le i \le n) \end{cases}$$

$$C_P(i) = \begin{cases} \dfrac{A(1)P_S[C_M(1) - C_P(1)] + C_F(1)Q_P(1)\dfrac{\alpha(1)}{1+\alpha(1)}}{Q_P(1)} & (i = 1) \\ \dfrac{A(i)P_S[C_M(i) - C_P(i)] + C_F(i)Q_P(i)\dfrac{\alpha(i)}{1+\alpha(i)} + C_P(i-1)Q_P(i-1)}{Q_P(i)} & (2 \le i \le n) \end{cases}$$

$$\pi_M(i) = F(C_M(i)),\ \pi_P(i) = F(C_P(i))$$

A(i) [m$^2$]: membrane area at i-th measurement location $C_F(i)$ [kg/m$^3$]: solute concentration of water-to-be-treated at i-th measurement location $C_M(i)$ [kg/m$^3$]: solute concentration on membrane surface of water-to-be-treated at i-th measurement location $C_P(i)$ [kg/m$^3$]: solute concentration of permeate at i-th measurement location F [Pa]: function for calculating osmotic pressure G [Pa]: function for calculating pressure loss of water-to-be-treated $L_P$ [m/s/Pa]: solvent permeability coefficient of separation membrane ($L_P(0)$ is used in first calculation)

$P_F(i)$ [Pa]: pressure of water-to-be-treated at i-th measurement location $P_P(i)$ [Pa]: pressure of permeate at i-th measurement location $P_S$ [m/s]: solute permeability coefficient of separation membrane ($P_S(0)$ is used in first calculation)

$Q_F(i)$ [m$^3$/s]: flow rate of water-to-be-treated at i-th measurement location $Q_P(i)$ [m$^3$/s]: flow rate of permeate at i-th measurement location $\alpha(i)$ [—]: mixing rate of water-to-be-treated at i-th measurement location ($\alpha(0)$ is used in first calculation)

$\pi_M(i)$[Pa]: membrane surface osmotic pressure of water-to-be-treated at i-th measurement location $\pi_P(i)$ [Pa]: osmotic pressure of permeate at i-th measurement location (5) When a difference between initial values and the calculated values of $Q_P(i)$ and $C_P(i)$ does not fall within an allowable error, it is more preferable to change the initial values of $Q_P(i)$ and $C_P(i)$ by a solution algorithm such as a Newton's method and a gradient method.

(6) Calculations in (1) to (4) are repeated, and when the difference between the initial values and the calculated values of $Q_P(i)$ and $C_P(i)$ falls within the allowable error, the calculated values of $Q_P(i)$ and $C_P(i)$ are solutions.

(7) When $2 \le i \le n$, a flow rate $Q_F(i-1)$ and concentration $C_F(i-1)$ of the water-to-be-treated at an (i−1)-th measurement location and a flow rate $Q_P(i-1)$ and concentration $C_P(i-1)$ of the permeate at the (i−1)-th measurement location are used to calculate the flow rate $Q_F(i)$ and the solute concentration $C_F(i)$ of the water-to-be-treated at the i-th measurement location based on the following mass balance formula of solvent and solute.

Here, a pressure $P_F(i)$ of the water-to-be-treated at the i-th measurement location is calculated using a pressure loss of the water-to-be-treated based on a pressure $P_F(i-1)$ and the flow rate $Q_F(i-1)$ of the water-to-be-treated at the (i−1)-th measurement location. The pressure loss is calculated by a theoretical formula of fluid dynamics or the like.

[Formula 6]

$$Q_F(i) = \begin{cases} Q_F(1) & (i = 1) \\ Q_F(i-1) - Q_P(i) & (2 \le i \le n) \end{cases}$$

$$C_F(i) = \begin{cases} C_F(1) & (i = 1) \\ \dfrac{C_F(i-1)\,Q_F(i-1) - C_P(i-1)\,Q_P(i-1)}{Q_F(i)} & (2 \le i \le n) \end{cases}$$

$$P_F(i) = \begin{cases} P(1) & (i = 1) \\ P(i-1) - G(Q_F(i-1)) & (i \ge 2) \end{cases}$$

$C_F(i)$ [kg/m$^3$]: solute concentration of water-to-be-treated at i-th measurement location $C_P(i)$ [kg/m$^3$]: solute concentration of permeate at i-th measurement location G [Pa]: function for calculating pressure loss of water-to-be-treated $P_F(i)$ [Pa]: pressure of water-to-be-treated at i-th measurement location $P_P(i)$ [Pa]: pressure of permeate at i-th measurement location $Q_F(i)$ [m$^3$/s]: flow rate of water-to-be-treated at i-th measurement location $Q_P(i)$ [m$^3$/s]: flow rate of permeate at i-th measurement location (8) By executing the calculations of (1) to (7) until i=n, flow rates and solute concentration of the permeate can be calculated for all the measurement locations.

Figure 4:
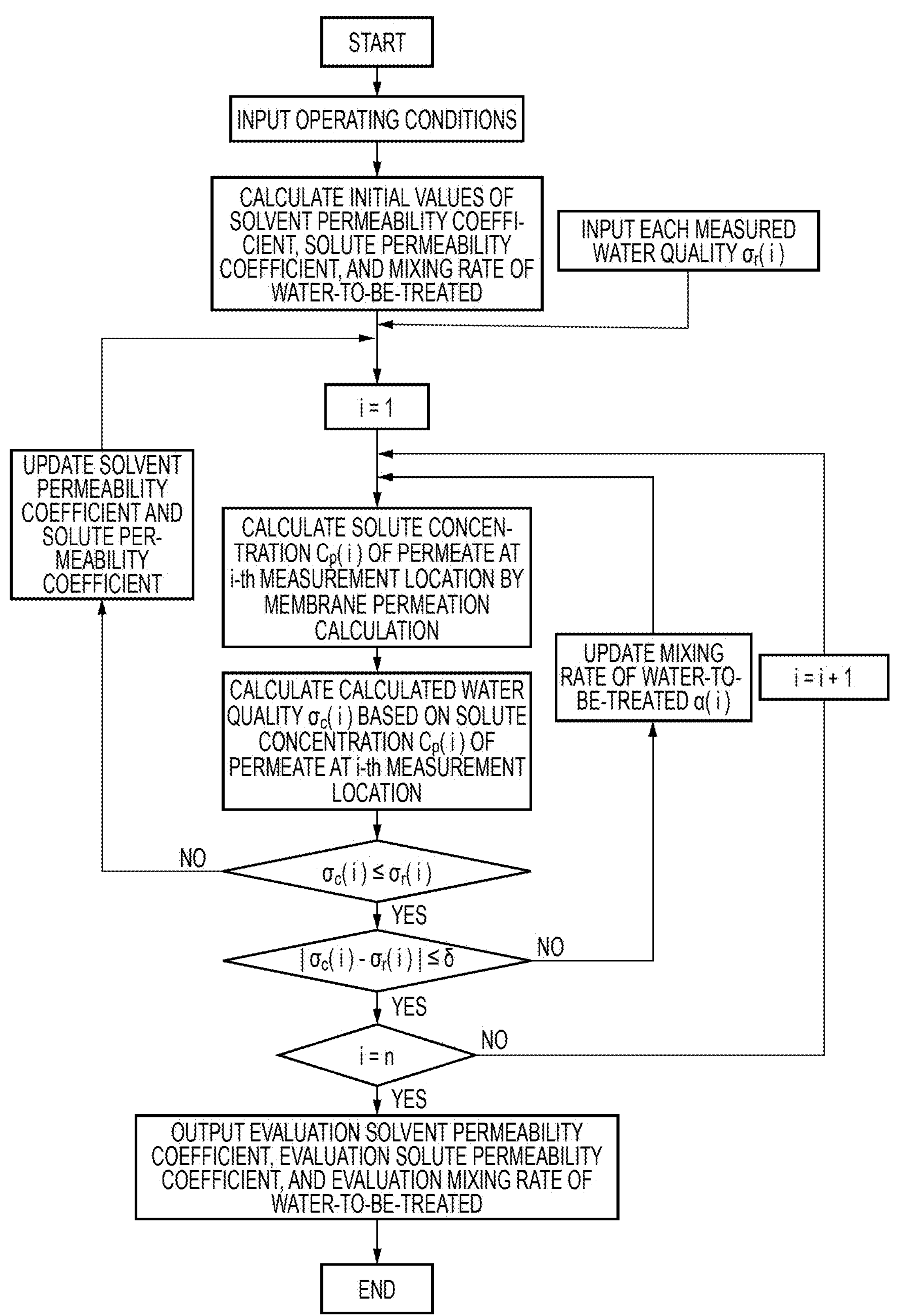
FIG. 4 is an example of a calculation flow of an evaluation solvent permeability coefficient, an evaluation solute permeability coefficient, and an evaluation mixing rate of water-to-be-treated.

Next, according to a flow of FIG. 4, an evaluation solvent permeability coefficient, an evaluation solute permeability coefficient, and an evaluation mixing rate of water-to-be-treated are determined such that a difference between the measured permeate quality and the calculated permeate quality calculated based on the solute concentration of the permeate 14 obtained by the membrane permeation calculation falls within a predetermined range.

FIG. 4 is a flow for determining an evaluation solvent permeability coefficient and an evaluation solute permeability coefficient that are common to all measurement locations, and an individual evaluation mixing rate of water-to-be-treated $\alpha$ for each measurement location such that the difference between the measured permeate quality and the calculated permeate quality calculated based on the solute concentration of the permeate 14 obtained by the membrane permeation calculation falls within a predetermined range $\delta$.

The operating conditions, the initial values of the solvent permeability coefficient and the solute permeability coefficient, and measured permeate quality $\sigma_r$ for each measurement location are input, and the mixing rate of water-to-be-treated $\alpha$ is determined such that calculated permeate quality $\sigma_c$ for each measurement location matches the measured permeate quality $\sigma_r$ for each measurement location from an end portion sealed by, for example, a sealing means toward the other end portion of the state diagnosis target separation membrane element.

In a case where calculated water quality $\sigma_c(i)$ of the permeate at the i-th measurement location takes a value larger than measured water quality $\sigma_r(i)$, the solvent permeability coefficient and the solute permeability coefficient are input again to recalculate a mixing rate of water-to-be-treated $\alpha(i)$.

Regarding all the measurement locations, a final evaluation solvent permeability coefficient, a final evaluation solute permeability coefficient, and a final evaluation mixing rate of water-to-be-treated $\alpha$ can be determined by repeating the calculation of the mixing rate of water-to-be-treated $\alpha$ until a difference between the calculated permeate quality $\sigma_c$ and the measured permeate quality $\sigma_r$ falls within the predetermined range $\delta$.

Here, in a case where the calculated water quality of the permeate is electric conductivity, it is preferable to calculate the water quality by a theoretical formula such as a Debye-Huckel formula or an Onsager formula.

Figure 5:
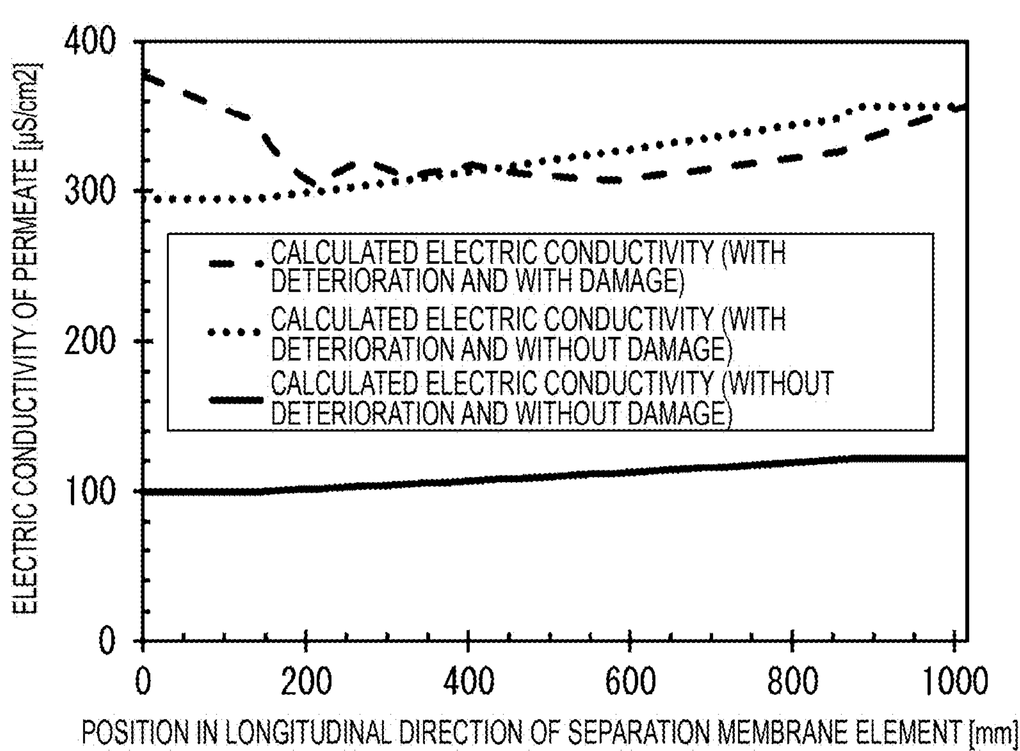
FIG. 5 is an example of an influence of presence or absence of deterioration and damage on a profile of electric conductivity of permeate.

FIG. 5 is an example of an influence of presence or absence of deterioration and damage on a profile of electric conductivity of the permeate.

Here, a position of the state diagnosis target separation membrane element in the longitudinal direction is a position at which the end portion sealed by the sealing means is set to zero. In a case where there is no deterioration and damage in the state diagnosis target separation membrane element, the electric conductivity of the permeate monotonically increases from the end portion sealed by the sealing means toward the other end portion.

In a case where there is deterioration and there is no damage in the state diagnosis target separation membrane element, the electric conductivity of the permeate increases as a whole and monotonically increases from the end portion sealed by the sealing means toward the other end portion, as compared with the case where there is no deterioration and damage in the state diagnosis target separation membrane element.

Figure 6:
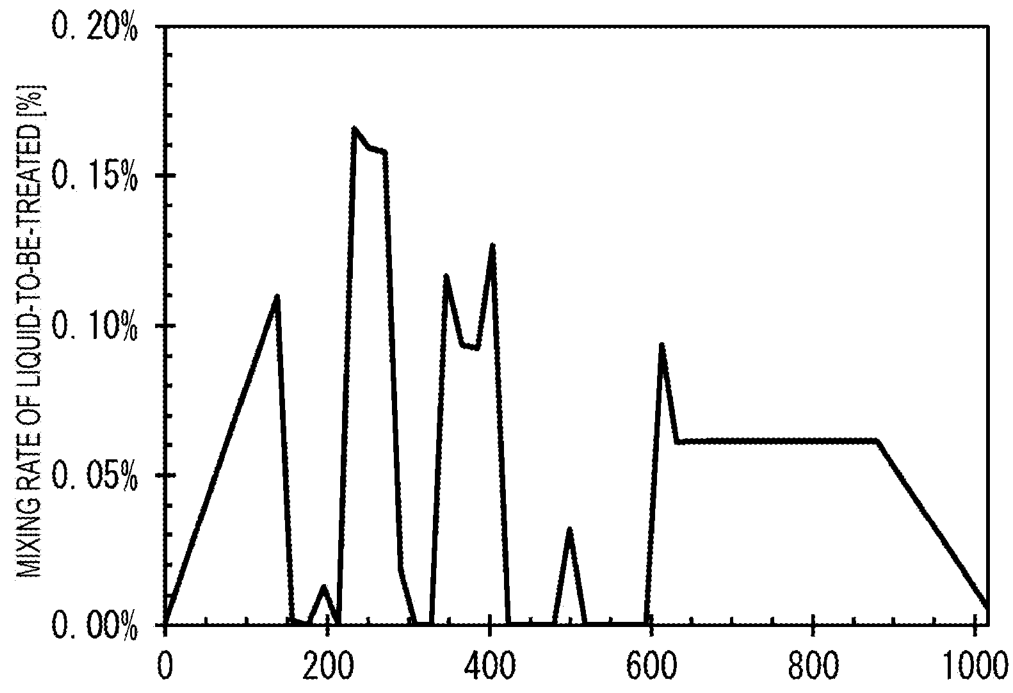
FIG. 6 is an example of distribution of a mixing rate of water-to-be-treated in a longitudinal direction of the separation membrane element.

In a case where there is damage in the state diagnosis target separation membrane element, the electric conductivity does not monotonically increase because the water-to-be-treated is mixed at the position with damage in FIG. 6.

Figure 7:
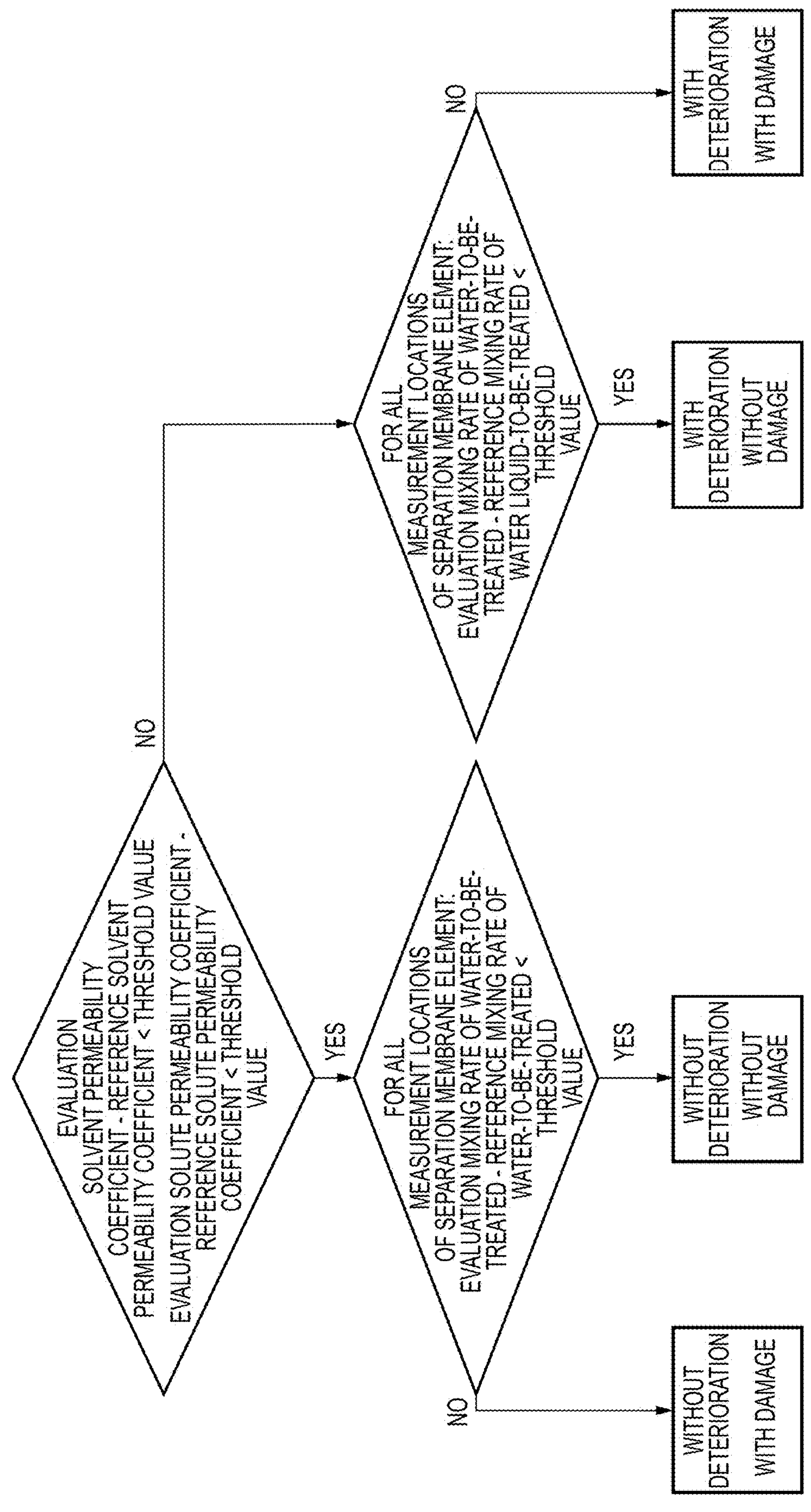
FIG. 7 is an example of a state diagnosis flow of the separation membrane element.

In step 4, at least any of the determined evaluation solvent permeability coefficient, evaluation solute permeability coefficient, and evaluation mixing rate of water-to-be-treated is compared with a reference solvent permeability coefficient, a reference solute permeability coefficient, and a reference mixing rate of water-to-be-treated, which are acquired in advance as references to be compared, and at least any of presence or absence of deterioration or damage, a degree of deterioration or damage, and a position where damage has occurred in the state diagnosis target separation membrane element is determined based on the state diagnosis reference of the separation membrane element in FIG. 7.

Here, when setting the reference, for example, at the time of production of the state diagnosis target separation membrane element, at the start of operation, or at the time of resuming the operation after chemical cleaning, the state diagnosis target separation membrane element before and after the operation can be compared, which is preferable.

An example of a diagnosis method for the state diagnosis target separation membrane element is described below, but is not limited thereto.

In determination of the presence or absence of deterioration of the state diagnosis target separation membrane element, it can be determined that deterioration has occurred in the state diagnosis target separation membrane element in a case where, for example, when the evaluation solvent permeability coefficient is reduced as compared to the reference solvent permeability coefficient, or the evaluation solute permeability coefficient is increased as compared to the reference solute permeability coefficient, and an increase amount in the evaluation solvent permeability coefficient compared to the reference solvent permeability coefficient and a reduction amount in the evaluation solvent permeability coefficient compared to the reference solute permeability coefficient take values larger than predetermined threshold values.

In determination of the degree of deterioration of the state diagnosis target separation membrane element, in a case where deterioration occurs in the state diagnosis target separation membrane element, the degree of the deterioration can be quantitatively determined based on, for example, the increase amount in the evaluation solvent permeability coefficient compared to the reference solvent permeability coefficient acquired in advance at the start of operation and the reduction amount in the evaluation solute permeability coefficient compared to the reference solute permeability coefficient acquired in advance at the start of operation, which is preferable.

In determination of the presence or absence of damage and the position of damage of the state diagnosis target separation membrane element, it can be determined that damage occurs at a position where the evaluation mixing rate of water-to-be-treated is increased than the reference mixing rate of water-to-be-treated and an increase amount thereof is larger than a predetermined threshold value, among the measurement locations of the state diagnosis target separation membrane element.

Regarding the degree of damage of the state diagnosis target separation membrane element, it is more preferable to quantitatively determine, in a case where damage occurs in the state diagnosis target separation membrane element, the degree of the damage based on, for example, an increase amount in the evaluation mixing rate of water-to-be-treated compared to the reference mixing rate of water-to-be-treated acquired in advance at the start of operation.

Further, the presence or absence of deterioration and damage of the state diagnosis target separation membrane element can also be determined by comparing a calculated permeate flow rate and a calculated permeate concentration with an evaluation permeate flow rate and an evaluation permeate concentration, the calculated permeate flow rate and the calculated permeate concentration being calculated by executing the membrane permeation calculation using the operating conditions, the reference solvent permeability coefficient, the reference solute permeability coefficient, and the reference mixing rate of water-to-be-treated.

Specifically, in a case where an increase amount in the evaluation permeate flow rate compared to the calculated permeate flow rate takes a value larger than a predetermined threshold value, it can be determined that damage occurs in the state diagnosis target separation membrane element, and in a case where a reduction amount in the evaluation permeate flow rate compared to the calculated permeate flow rate takes a value smaller than a predetermined threshold value, it can be determined that deterioration occurs in the state diagnosis target separation membrane element.

Further, in a case where the increase amount in the evaluation permeate concentration compared to the calculated permeate concentration takes a value larger than a predetermined threshold value, it can be determined that at least any of deterioration or damage of the state diagnosis target separation membrane element occurs.

The threshold values may be arbitrary determined according to the operating conditions, required water quality, and the like, and for example, when the reduction amount in the evaluation solvent permeability coefficient compared to the reference solvent permeability coefficient, the increase amount in the evaluation solute permeability coefficient compared to the reference solute permeability coefficient, and the increase amount in the evaluation mixing rate of water-to-be-treated compared to the reference mixing rate of water-to-be-treated are set in ranges of 0.1% to 5.0%, 5.1% to 10.0%, 10.1% to 15.0%, 15.1% to 20.0%, and the like, respectively, the degree of deterioration can be further quantified, which is preferable.

In this case, it is more preferable to determine the threshold values in consideration of a fluctuation range that fluctuates depending on the operating conditions and measurement errors of the measured water quality.

According to the present invention, by periodically executing the state diagnosis method for a separation membrane element of the present invention during an operation period of a water treatment process, the occurrence and degree of deterioration and damage of the separation membrane element can be monitored, and in this case, by issuing an alarm when a preset threshold value is reached, measures such as changing the operating conditions or cleaning the device can be quickly taken, and by setting a plurality of threshold values, a more accurate alarm corresponding to a stage of the deterioration or damage can be issued.

When the deterioration or damage further progresses and reaches a level at which the performance of the separation membrane element cannot be recovered by changing the operating conditions or cleaning, a measure of preferentially replacing the separation membrane element can be taken.

Further, the progress of the deterioration or damage can be predicted based on a relation between the degree of deterioration or damage and an operation time, and it is more preferable to predict a timing of device cleaning or a timing of replacement of the separation membrane element based on a prediction result and the threshold value.

Thus, according to the above-described state diagnosis method for a separation membrane element, since a cause and a degree of occurrence of an abnormality in the separation membrane element can be accurately detected to take an accurate measure against the abnormality, a water treatment device can be stably operated.

In the above description, it is assumed that one end portion of the water collecting pipe is sealed by a sealing means, but in a water treatment process, both ends may be opened to take out the permeate. Even in such a case, the above-mentioned method can be applied. In this case, by taking water while causing the flow rate ratio of the permeate discharged from both ends to change and executing state diagnosis of the separation membrane element based on the measured permeate quality, the presence or absence, degree, and position of the deterioration or damage of the separation membrane element can be identified, which is preferable.

Specifically, a desalination rate of the separation membrane element is a constant value, and the permeate concentration increases as the concentration of the water-to-be-treated increases. As a result, as compared with the permeate discharged from a water-to-be-treated supply side, the permeate concentration discharged from the other end side is higher. Therefore, when a ratio of the permeate on the water-to-be-treated supply side is increased, the permeate concentration gradually increases. On the other hand, since the permeate on the other end contains less upstream permeate, the permeate concentration here also gradually increases. However, in the case where there is deterioration or damage, each permeate concentration does not gradually increase and an inflection point occurs, and the presence or absence, degree, and position of the deterioration or damage can be identified based on a ratio of an amount of permeate at which the inflection point occurs.

In the above-mentioned state diagnosis method for a separation membrane element, one separation membrane element may be divided into a plurality of locations and calculated, but in a normal water treatment plant, when a plurality of separation membrane elements are arranged in a large number in series, it is common to connect and use seven to eight separation membrane elements. In this case, the state diagnosis may be executed in unit of separation membrane element.

Figure 8:
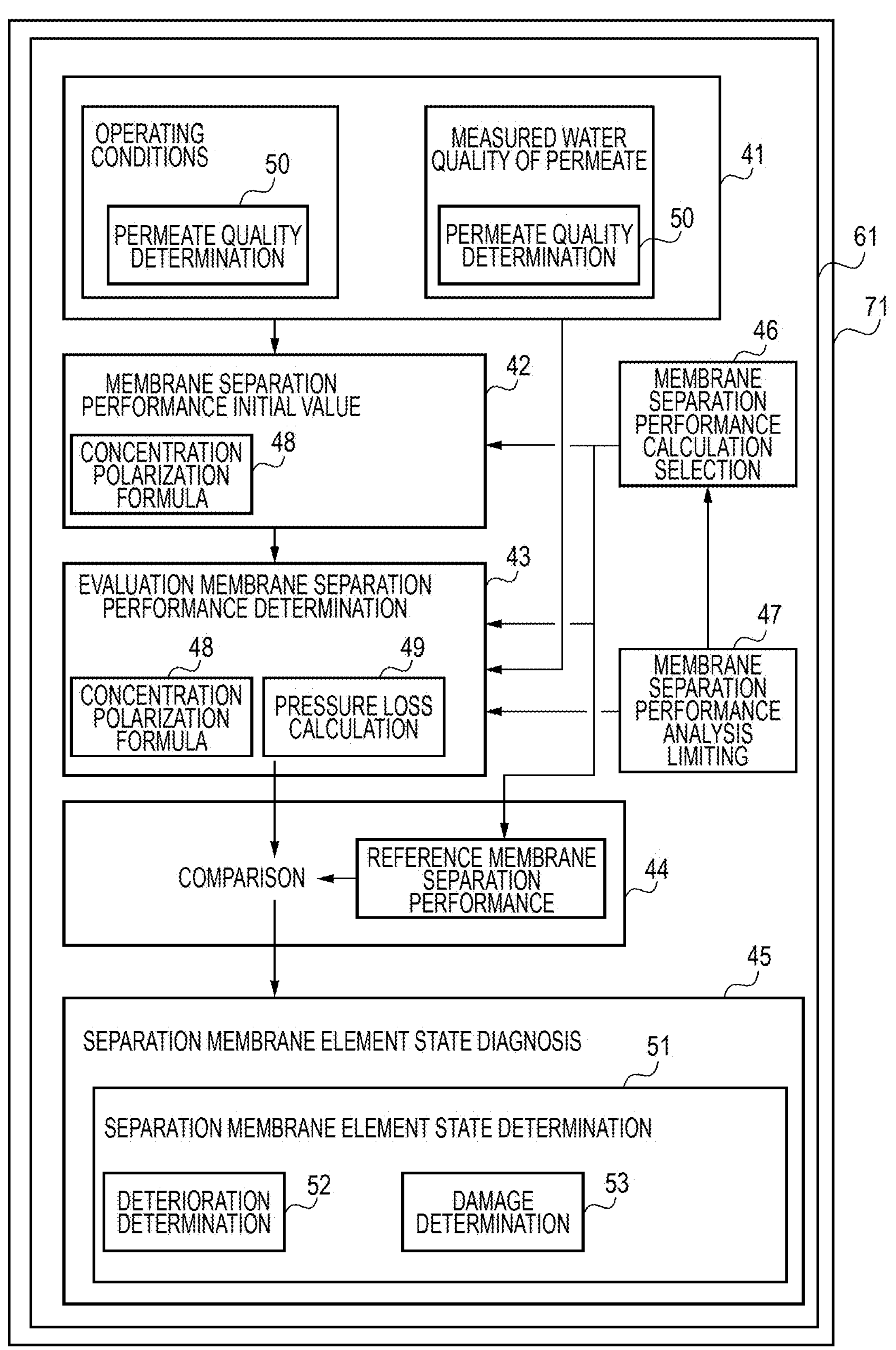
FIG. 8 is an example of a state diagnosis program for a separation membrane element for executing a state diagnosis method for a separation membrane element according to the present invention by a computer.

FIG. 8 illustrates a state diagnosis program for a separation membrane element for executing the state diagnosis method for a separation membrane element according to the present invention by a computer. The state diagnosis program includes the following steps.

The state diagnosis program for a separation membrane element includes: a data input unit 41 configured to input data of a separation membrane element of at least any of a pressure, a flow rate, and solute concentration of the water-to-be-treated, at least any of a pressure, a flow rate, and solute concentration of the permeate, and permeate quality measured at at least two locations of a permeate channel; a membrane separation performance initial value calculation unit 42 configured to calculate an initial value of membrane separation performance; an evaluation membrane separation performance determination unit 43 configured to execute calculation of membrane separation performance for each measurement location using the initial value of the membrane separation performance, and determine evaluation membrane separation performance such that a difference between calculated permeate quality calculated based on the membrane separation performance and measured permeate quality falls within a predetermined range; a membrane separation performance comparison unit 44 configured to compare the determined membrane separation performance with reference membrane separation performance; and a separation membrane element state diagnosis unit 45 configured to diagnose a state of the separation membrane element based on a predetermined state diagnosis reference of the separation membrane element from a result of the comparison of the membrane separation performance.

In addition, when there provided a membrane separation performance calculation selecting unit 46 configured to select to calculate, for the calculation of membrane separation performance, at least any of a removal rate, a permeability, a solvent permeability coefficient, a solute permeability coefficient, and a mixing rate of water-to-be-treated, the membrane separation performance can be analyzed from various viewpoints by changing selections, which is preferable.

Further, when there provided a membrane separation performance analysis limiting unit 47 configured to calculate the membrane separation performance as the solvent permeability coefficient, the solute permeability coefficient, and the mixing rate of water-to-be-treated, which are calculated by the membrane permeation calculation, and calculate the evaluation membrane separation performance and the reference membrane separation performance as a solvent permeability coefficient and a solute permeability coefficient common to the measurement locations, and an individual mixing rate of water-to-be-treated for each measurement location, the membrane separation performance can be analyzed in more detail, which is more preferable.

In the membrane permeation calculation, there provided a concentration polarization formula calculation unit 48 configured to execute the membrane permeation calculation based on a concentration polarization formula derived from a concentration polarization model representing a mass balance of solute permeation, and a pressure loss calculation unit 49 configured to calculate pressures of water-to-be-treated at second and subsequent measurement locations among the measurement locations based on a supply pressure and a flow rate of water-to-be-treated supplied to a preceding measurement location by pressure loss calculation based on fluid dynamics, and the calculation accuracy can be increased when the permeation calculation is executed using the units, which is preferable.

The data input unit 41 includes a permeate quality determination unit 50 configured to determine, for the input measured permeate quality and the calculated permeate quality, permeate quality based on at least any of electric conductivity, TOC, refractive index, turbidity, absorbance, emission intensity, chromaticity, IR, mass spectrometry, ion chromatography, ICP, pH, and radiation rays.

In the separation membrane element state diagnosis unit 45, a separation membrane element state determination unit 51 is incorporated therein, the separation membrane element state determination unit 51 being configured to determine that a state of the separation membrane element determined based on the state diagnosis reference is degradation and damage, and is at least any of presence or absence of degradation and damage, a position of damage, and a degree of degradation, and in the separation membrane element state determination unit 51, a separation membrane element deterioration determination unit 52 and a separation membrane element damage determination unit 53 are provided, the separation membrane element deterioration determination unit 52 being configured to determine as deterioration when at least any of a case where an evaluation solvent permeability coefficient is reduced from a reference solvent permeability coefficient and a case where an evaluation solute permeability coefficient is increased from a reference solute permeability coefficient occurs, and determine a degree of the deterioration based on at least any of a degree of reduction of the evaluation solvent permeability coefficient from the reference solvent permeability coefficient and a degree of increase of the evaluation solute permeability coefficient from the reference solute permeability coefficient, and the separation membrane element damage determination unit 53 being configured to determine that damage occurs in a case where an evaluation mixing rate of water-to-be-treated at the measurement location is increased from a reference mixing rate of water-to-be-treated and determine a damage position at the measurement location, or determine a degree of the damage based on a degree of increase of the evaluation mixing rate of water-to-be-treated at the measurement location from the reference mixing rate of water-to-be-treated, whereby the state diagnosis of the separation membrane element can also be quantitatively executed.

In addition, the programs may be stored in, as programs that are readable in a computer, a computer-readable recording medium on which the programs are recorded. Further, a system for storing the recording medium may be an ordinary computer, and may be an on-premises server or a cloud server. As described above, in a case where a calculation program is stored in a server, it is more preferable that the system accesses the program via a browser on the computer and executes the calculation program to execute calculation.

EXAMPLES

Example

A state diagnosis test was executed on one separation membrane element using a polyamide-based reverse osmosis membrane having performance of a water production amount of 37.5 $m^3$/day and a desalination rate of 99.8% under a standard condition (a pressure of 56 kg/$cm^2$, a 32,000 mg/L NaCl aqueous solution, a temperature of 25° C., and a yield of 8%).

A test condition was set to a flow rate of water-to-be-treated of 97 L/min, a permeate flow rate of 17 L/min, water-to-be-treated of a 32,000 mg/L NaCl aqueous solution, a water temperature of 30° C., and a pH of 6.5, and measured electric conductivity was measured at 42 points in an axial direction of a water collecting pipe of the separation membrane element.

Figure 9:
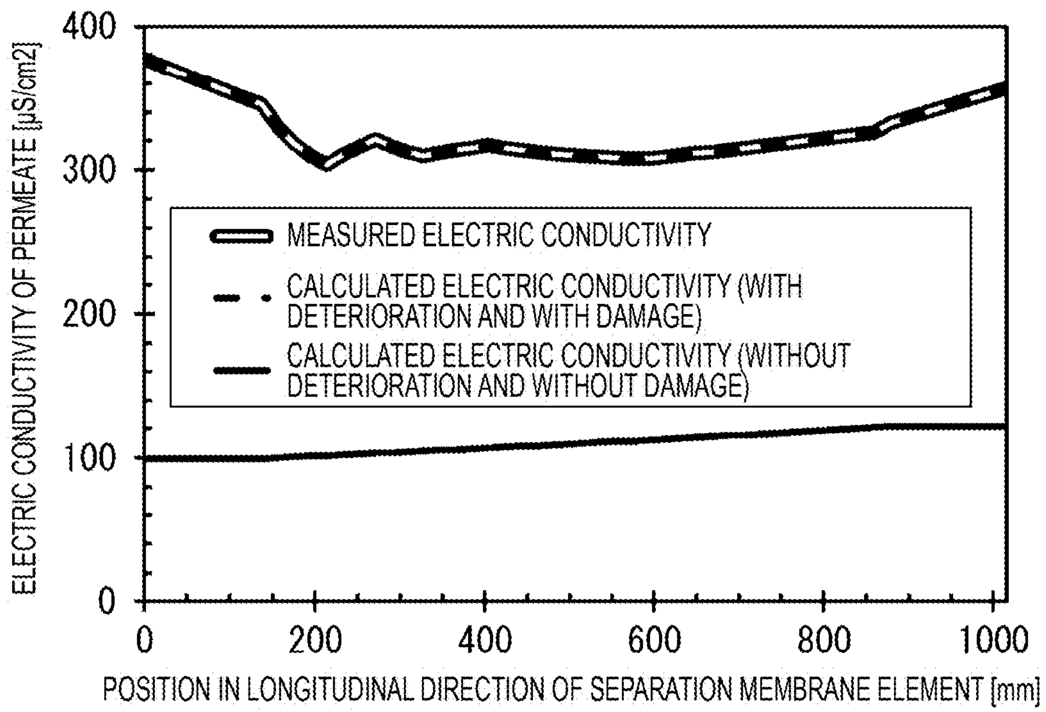
FIG. 9 illustrates profiles of measured electric conductivity of the separation membrane element during operation, calculated electric conductivity (with deterioration and with damage) of the permeate calculated by using the evaluation solvent permeability coefficient, the evaluation solute permeability coefficient, and the mixing rate of water-to-be-treated, which are determined so as to match the measured electric conductivity of the separation membrane element during operation, and calculated electric conductivity (without deterioration and without damage) calculated based on a reference solvent permeability coefficient and a reference solute permeability coefficient of the separation membrane element.

FIG. 9 illustrates profiles of calculated electric conductivity of the separation membrane element, calculated electric conductivity (with deterioration and with damage) calculated by using the evaluation solvent permeability coefficient, the evaluation solute permeability coefficient, and the mixing rate of water-to-be-treated, which are determined so as to match the measured electric conductivity of the separation membrane element during operation, and calculated electric conductivity (without deterioration and without damage) calculated based on a reference solvent permeability coefficient and a reference solute permeability coefficient at the start of operation of the separation membrane element.

Figure 10:
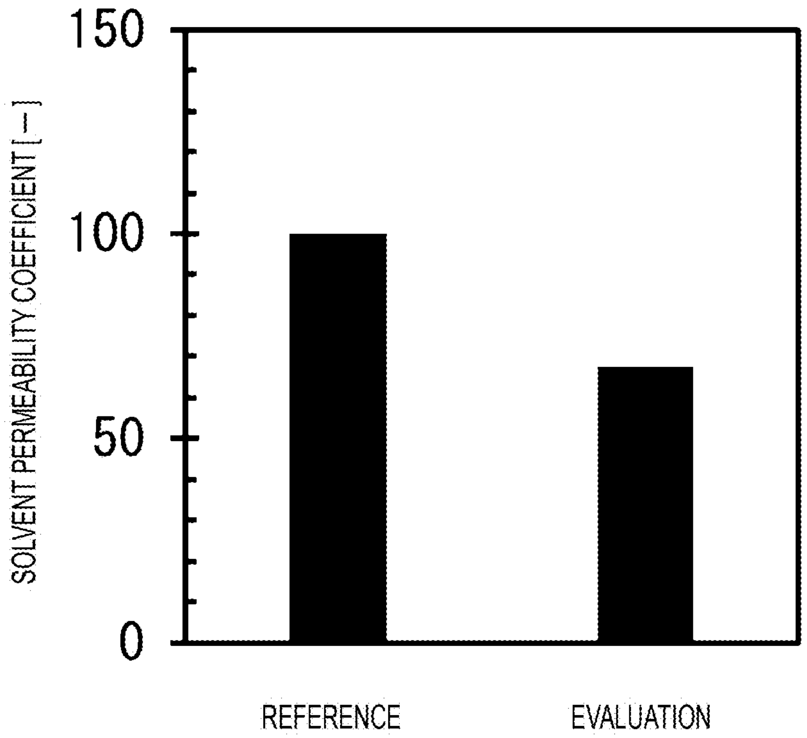
FIG. 10 illustrates a comparison between the reference solvent permeability coefficient and the evaluation solvent permeability coefficient of the separation membrane element.

FIG. 10 illustrates an evaluation solvent permeability coefficient when the reference solvent permeability coefficient of the separation membrane element is 100%.

Figure 11:
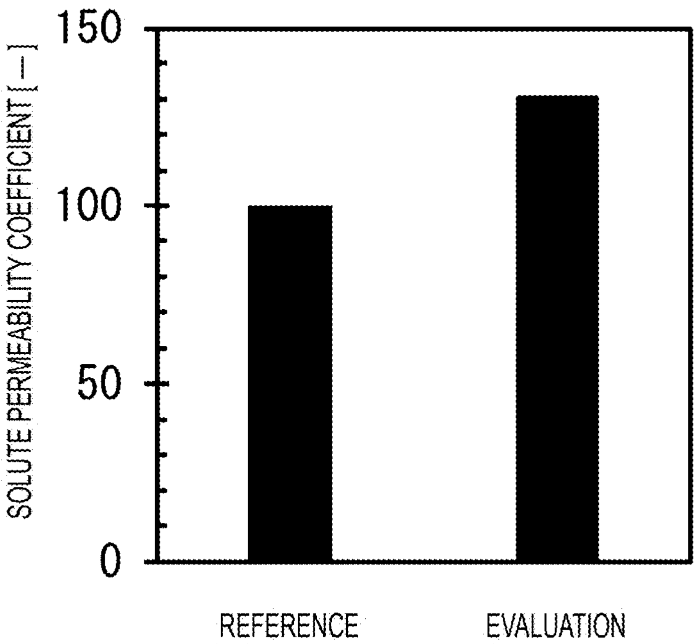
FIG. 11 illustrates a comparison between the reference solute permeability coefficient and the evaluation solute permeability coefficient.

FIG. 11 illustrates an evaluation solute permeability coefficient when the reference solute permeability coefficient of the separation membrane element is 100%.

The evaluation solvent permeability coefficient was reduced by 32.5% with respect to the reference solvent permeability coefficient. In addition, the evaluation solute permeability coefficient was increased by 30.7% with respect to the reference solute permeability coefficient.

Figure 12:
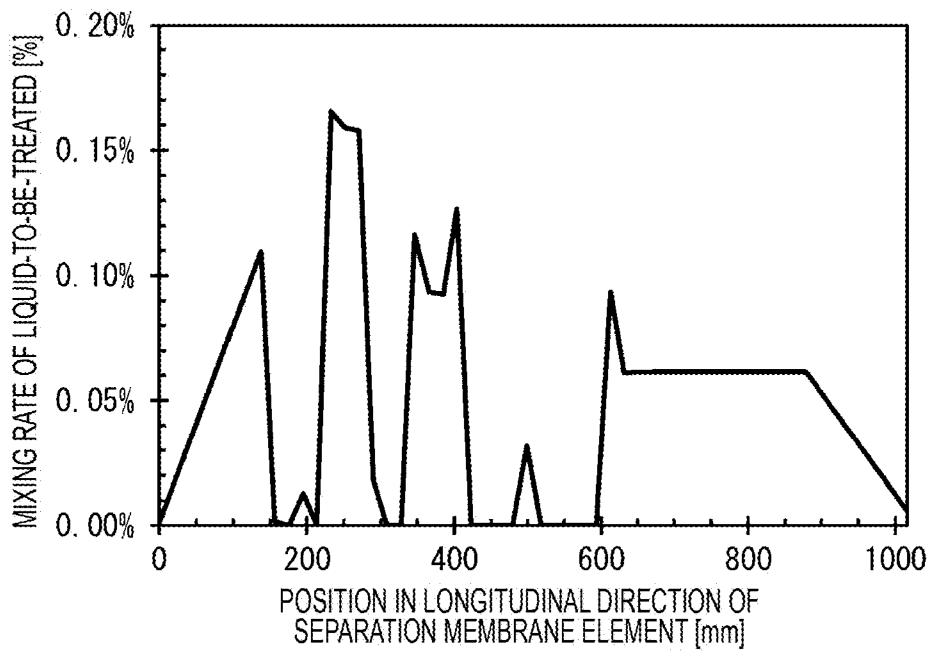
FIG. 12 illustrates the mixing rate of water-to-be-treated determined based on the measured electric conductivity of the separation membrane element.

FIG. 12 illustrates the mixing rate of water-to-be-treated determined based on the measured electric conductivity of the separation membrane element during operation.

It can be quantitatively determined that deterioration occurred in the separation membrane element since the evaluation solvent permeability coefficient was reduced as compared to the reference solvent permeability coefficient and the evaluation solute permeability coefficient was increased as compared to the reference solute permeability coefficient, and that damage also occurred in the separation membrane element since there is a position where the mixing rate of water-to-be-treated is not zero.

COMPARATIVE EXAMPLE

Figure 13:
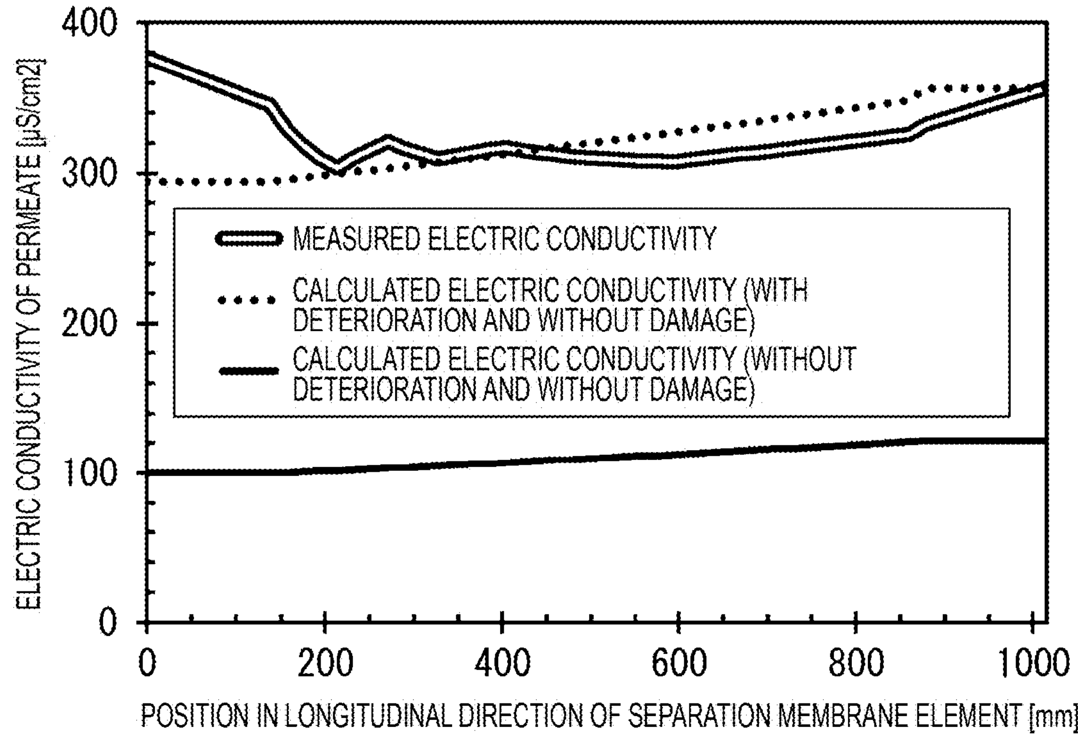
FIG. 13 illustrates profiles of measured electric conductivity of the separation membrane element, calculated electric conductivity (with deterioration and without damage) calculated using a solvent permeability coefficient and a solute permeability coefficient and calculated electric conductivity (without deterioration and without damage) calculated based on a solvent permeability coefficient and a solute permeability coefficient at the start of operation, without considering damage by setting the mixing rate of water-to-be-treated to zero.

FIG. 13 illustrates profiles of measured electric conductivity of a damaged separation membrane element during operation, calculated electric conductivity (with deterioration and without damage) calculated using a solvent permeability coefficient and a solute permeability coefficient and calculated electric conductivity (without deterioration and without damage) calculated based on a solvent permeability coefficient and a solute permeability coefficient at the start of operation, without considering damage by setting the mixing rate of water-to-be-treated to zero.

When the mixing rate of water-to-be-treated is set to zero without considering the damage defined in the present invention, it is not possible to determine the evaluation solvent permeability coefficient and the evaluation solute permeability coefficient so as to match the measured electric conductivity and the calculated electric conductivity of the separation membrane element during operation, and it is not possible to correctly determine the state of the separation membrane element.

Although various embodiments have been described above with reference to the drawings, it is obvious that the present invention is not limited to the examples. It is apparent to those skilled in the art that various changes or modifications can be conceived within the scope described in the claims, and it should be naturally understood that those belong to the technical scope of the present invention. In addition, the components described in the above embodiments may be combined optionally without departing from the gist of the invention.

The present application is based on the Japanese patent application (JP2021-193800A) filed on Nov. 30, 2021, the contents of which are incorporated herein by reference.

REFERENCE SIGNS LIST

11: separation membrane element
12: water-to-be-treated
13: concentrate
14: permeate
15: separation membrane
16: water collecting pipe
17: end portion
18: end portion
21: sealing means
31: first measurement location
32: second measurement location
33: i-th measurement location
34: (n−1)-th measurement location
35: n-th measurement location
41: data input unit
42: membrane separation performance initial value calculation unit
43: evaluation membrane separation performance determination unit
44: membrane separation performance comparison unit
45: separation membrane element state diagnosis unit
46: membrane separation performance calculation selecting unit
47: membrane separation performance analysis limiting unit
48: concentration polarization formula calculation unit
49: pressure loss calculation unit
50: permeate quality determination unit
51: separation membrane element state determination unit
52: deterioration determination unit
53: damage determination unit
61: recording medium
71: computer

The invention claimed is:

1. A state diagnosis method for a separation membrane element for obtaining a permeate from a water-to-be-treated, the method comprising:

calculating an initial value of a membrane separation performance based on at least any of a pressure, a flow rate, and a solute concentration of the water-to-be-treated and at least any of a pressure, a flow rate, and a solute concentration of the permeate;

obtaining a measured permeate quality by a measurement of a permeate quality by passing through a tube having an outer diameter smaller than an inner diameter of a permeate channel to the permeate channel of the separation membrane element to sample the permeate of different locations of the separation membrane element at at least two measurement locations and measuring the permeate quality;

calculating the membrane separation performance for each of the measurement locations using the initial value of the membrane separation performance, and determining an evaluation membrane separation performance such that a difference between a calculated permeate quality calculated based on the membrane separation performance and the measured permeate quality falls within a predetermined range;

comparing the determined evaluation membrane separation performance with a reference membrane separation performance as a reference; and determining a state of the separation membrane element based on a predetermined state diagnosis reference of the separation membrane element.

2. The state diagnosis method for a separation membrane element according to claim 1, wherein the separation membrane element is a spiral type reverse osmosis membrane element, and the tube is inserted into a central pipe for permeate collection to sample the permeate at each distance of movement, and the measurement location is defined for each water sampling.

3. The state diagnosis method for a separation membrane element according to claim 1, wherein the membrane separation performance is at least any of a removal rate, a permeability, a solvent permeability coefficient, a solute permeability coefficient, and a mixing rate of water-to-be-treated.

4. The state diagnosis method for a separation membrane element according to claim 1, wherein the membrane separation performance is the solvent permeability coefficient, the solute permeability coefficient, and the mixing rate of water-to-be-treated, which are calculated by a membrane permeation calculation, and the evaluation membrane separation performance and the reference membrane separation performance are the solvent permeability coefficient and the solute permeability coefficient common to the measurement locations, and the mixing rate of water-to-be-treated which is individual for each of the measurement locations.

5. The state diagnosis method for a separation membrane element according to claim 4, wherein the membrane permeation calculation is based on a concentration polarization formula derived from a concentration polarization model representing a mass balance of solute permeation.

6. The state diagnosis method for a separation membrane element according to claim 1, wherein the measurement of the permeate quality is executed at each of the measurement locations dividing the permeate channel in an axial direction, and a pressure of the water-to-be-treated at second and subsequent measurement location are calculated from a supply pressure and a flow rate of the water-to-be-treated supplied to a preceding measurement location by pressure loss calculation based on fluid dynamics.

7. The state diagnosis method for a separation membrane element according to claim 1, wherein the measured permeate quality and the calculated permeate quality is at least any of an electric conductivity, TOC, a refractive index, a turbidity, an absorbance, an emission intensity, a chromaticity, IR, a mass spectrometry, an ion chromatography, ICP, pH, and a radiation ray.

8. The state diagnosis method for a separation membrane element according to claim 1, wherein the state of the separation membrane element determined based on the state diagnosis reference is degradation and damage, and is at least any of presence or absence of degradation and damage, a position of damage, and a degree of degradation and damage.

9. The state diagnosis method for a separation membrane element according to claim 8, wherein in the state diagnosis reference, it is determined as deterioration when at least any of a case where an evaluation solvent permeability coefficient is reduced from a reference solvent permeability coefficient and a case where an evaluation solute permeability coefficient is increased from a reference solute permeability coefficient occurs, and the degree of the deterioration is determined based on at least any of a degree of reduction of the evaluation solvent permeability coefficient from the reference solvent permeability coefficient and a degree of increase of the evaluation solute permeability coefficient from the reference solute permeability coefficient.

10. The state diagnosis method for a separation membrane element according to claim 8, wherein in the state diagnosis reference, it is determined as occurrence of damage in a case where an evaluation mixing rate of water-to-be-treated at the measurement location is increased from a reference mixing rate of water-to-be-treated and a damage position is determined at the measurement location, or the degree of damage is determined based on a degree of increase of the evaluation mixing rate of water-to-be-treated at the measurement location from the reference mixing rate of water-to-be-treated.

11. A non-transitory computer-readable recording medium storing a state diagnosis program for a separation membrane element, the program causing, in order to execute state diagnosis of a separation membrane element for obtaining a permeate from a water-to-be-treated, a computer to function as:

a data input unit configured to input data of the separation membrane element of at least any of a pressure, a flow rate, and a solute concentration of the water-to-be-treated, at least any of a pressure, a flow rate, and a solute concentration of the permeate, and a measured permeate quality obtained by a measurement of a permeate quality by passing through a tube having an outer diameter smaller than an inner diameter of a permeate channel to the permeate channel to sample the permeate of different locations at at least two measurement locations and measuring the permeate quality;

a membrane separation performance initial value calculation unit configured to calculate an initial value of a membrane separation performance;

an evaluation membrane separation performance determination unit configured to calculate the membrane separation performance for each of the measurement locations using the initial value of the membrane separation performance, and determine an evaluation membrane separation performance such that a difference between a calculated permeate quality calculated based on the membrane separation performance and the measured permeate quality falls within a predetermined range;

a membrane separation performance comparison unit configured to compare the determined membrane separation performance with a reference membrane separation performance; and a separation membrane element state diagnosis unit configured to diagnose a state of the separation membrane element based on a predetermined state diagnosis reference of the separation membrane element from a result of the comparison of the membrane separation performance obtained by the membrane separation performance comparison unit.

12. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a membrane separation performance calculation selecting unit configured to select to calculate, for the calculation of membrane separation performance, at least any of a removal rate, a permeability, a solvent permeability coefficient, a solute permeability coefficient, and a mixing rate of the water-to-be-treated.

13. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a performance analysis limiting unit configured to calculate, by a membrane separation performance calculation unit, the solvent permeability coefficient, the solute permeability coefficient, and the mixing rate of water-to-be-treated, which are calculated by membrane permeation calculation, as the membrane separation performance, and calculate the evaluation membrane separation performance and the reference membrane separation performance as the solvent permeability coefficient and the solute permeability coefficient common to the measurement locations, and the mixing rate of water-to-be-treated which is individual for each of the measurement locations.

14. The non-transitory computer-readable recording medium storing a state diagnosis program for a separation membrane element according to claim 13, the program causing, in order to execute the state diagnosis of the separation membrane element for obtaining the permeate from the water-to-be-treated, a computer to function as:

a separation membrane element deterioration determination unit configured to, as the state diagnosis reference, determine as deterioration when at least any of a case where an evaluation solvent permeability coefficient is reduced from a reference solvent permeability coefficient and a case where an evaluation solute permeability coefficient is increased from a reference solute permeability coefficient occurs, and determine the degree of deterioration based on at least any of a degree of reduction of the evaluation solvent permeability coefficient from the reference solvent permeability coefficient and a degree of increase of the evaluation solute permeability coefficient from the reference solute permeability coefficient.

15. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a concentration polarization formula calculation unit configured to execute the membrane permeation calculation based on a concentration polarization formula derived from a concentration polarization model representing a mass balance of solute permeation.

16. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a pressure loss calculation unit configured to calculate a pressure of the water-to-be-treated at second and subsequent measurement location among the measurement locations from a supply pressure and a flow rate of the water-to-be-treated supplied to a preceding measurement location by pressure loss calculation based on fluid dynamics.

17. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a permeate quality determination unit configured to determine, for the measured permeate quality and the calculated permeate quality, permeate quality based on at least any of an electric conductivity, TOC, a refractive index, a turbidity, an absorbance, an emission intensity, a chromaticity, IR, a mass spectrometry, an ion chromatography, ICP, pH, and a radiation ray.

18. The non-transitory computer-readable recording medium storing a state diagnosis program for a separation membrane element according to claim 11, the program causing, in order to execute the state diagnosis of the separation membrane element for obtaining the permeate from the water-to-be-treated, a computer to function as:

a separation membrane element state determination unit configured to determine that a state of the separation membrane element determined based on the state diagnosis reference is degradation and damage, and is at least any of presence or absence of degradation and damage, a position of damage, and a degree of degradation and damage.

19. The non-transitory computer-readable recording medium storing a state diagnosis program for a separation membrane element according to claim 18, the program causing, in order to execute the state diagnosis of the separation membrane element for obtaining the permeate from the water-to-be-treated, a computer to function as:

a separation membrane element damage determination unit configured to, as the state diagnosis reference, determine that damage occurs in a case where an evaluation mixing rate of water-to-be-treated at the measurement location is increased from a reference mixing rate of water-to-be-treated and determine the damage position at the measurement location, or determine the degree of damage based on a degree of increase of the evaluation mixing rate of water-to-be-treated at the measurement location from the reference mixing rate of water-to-be-treated.

* * * * *